United States Patent [19]
Kastner et al.

[11] 3,913,116
[45] Oct. 14, 1975

[54] CAMERA WITH ADJUSTABLE VIEWFINDER

[75] Inventors: Erich Kastner, Munich; Kurt Wallner, Dietersheim, both of Germany

[73] Assignee: Arnold & Richter KG, Munich, Germany

[22] Filed: Jan. 17, 1974

[21] Appl. No.: 434,084

Related U.S. Application Data

[63] Continuation-in-part of Ser. No. 320,251, Jan. 2, 1973, abandoned.

[30] Foreign Application Priority Data

Jan. 7, 1972 Germany............................ 2200690

[52] U.S. Cl.................................. 354/223; 352/243
[51] Int. Cl. ............................................. G03b 13/10
[58] Field of Search ............ 352/243, 139; 354/219, 354/223, 224, 225; 350/49

[56] References Cited
UNITED STATES PATENTS

| | | |
|---|---|---|
| 1,310,776 | 7/1919 | Akeley............................ 354/225 X |
| 2,285,456 | 6/1942 | Nowland............................. 354/223 |
| 2,439,526 | 4/1948 | Ott......................................... 350/49 |
| 2,468,814 | 5/1949 | Coutant et al...................... 354/233 |
| 3,115,816 | 12/1963 | Muller............................... 350/49 X |
| 3,423,145 | 1/1969 | Breitengross..................... 350/49 X |

*Primary Examiner*—Samuel S. Matthews
*Assistant Examiner*—Alan Mathews
*Attorney, Agent, or Firm*—Fleit & Jacobson

[57] ABSTRACT

The camera is preferably a reflex camera and provided with a magnifying viewfinder and a camera handle. The viewfinder light path is diverted from the shooting light path, preferably by the reflex means, and emerges from the camera housing centrally and above the shooting lens. The eyepiece assembly of the viewfinder is carried by at least one pivoted viewfinder arm so that the eyepiece assembly is pivotally movable to the rear. The eyepiece assembly is also pivotally movable between positions on the right and left of the camera about the center line of the viewfinder light path exit opening in the camera housing.

8 Claims, 10 Drawing Figures

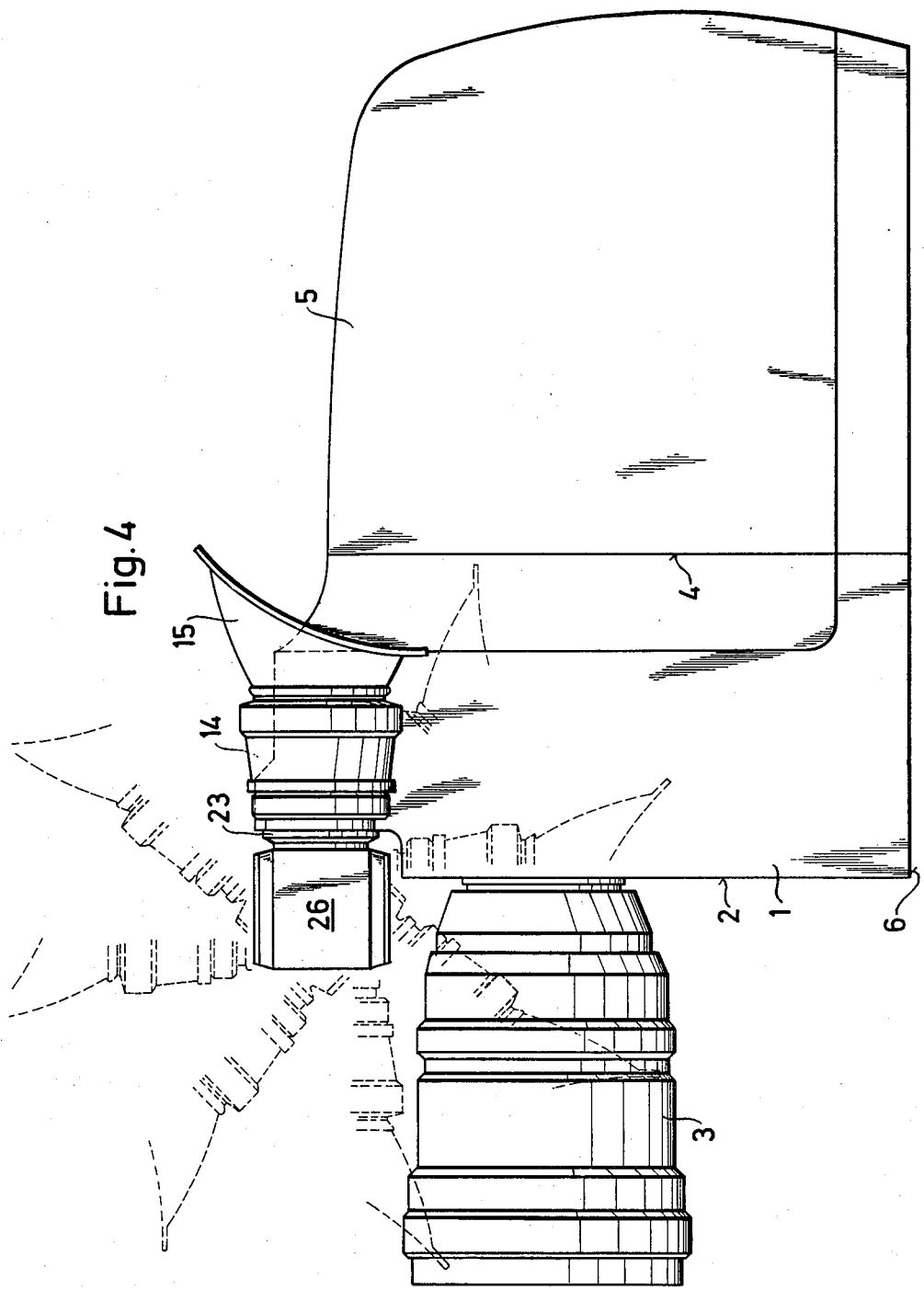

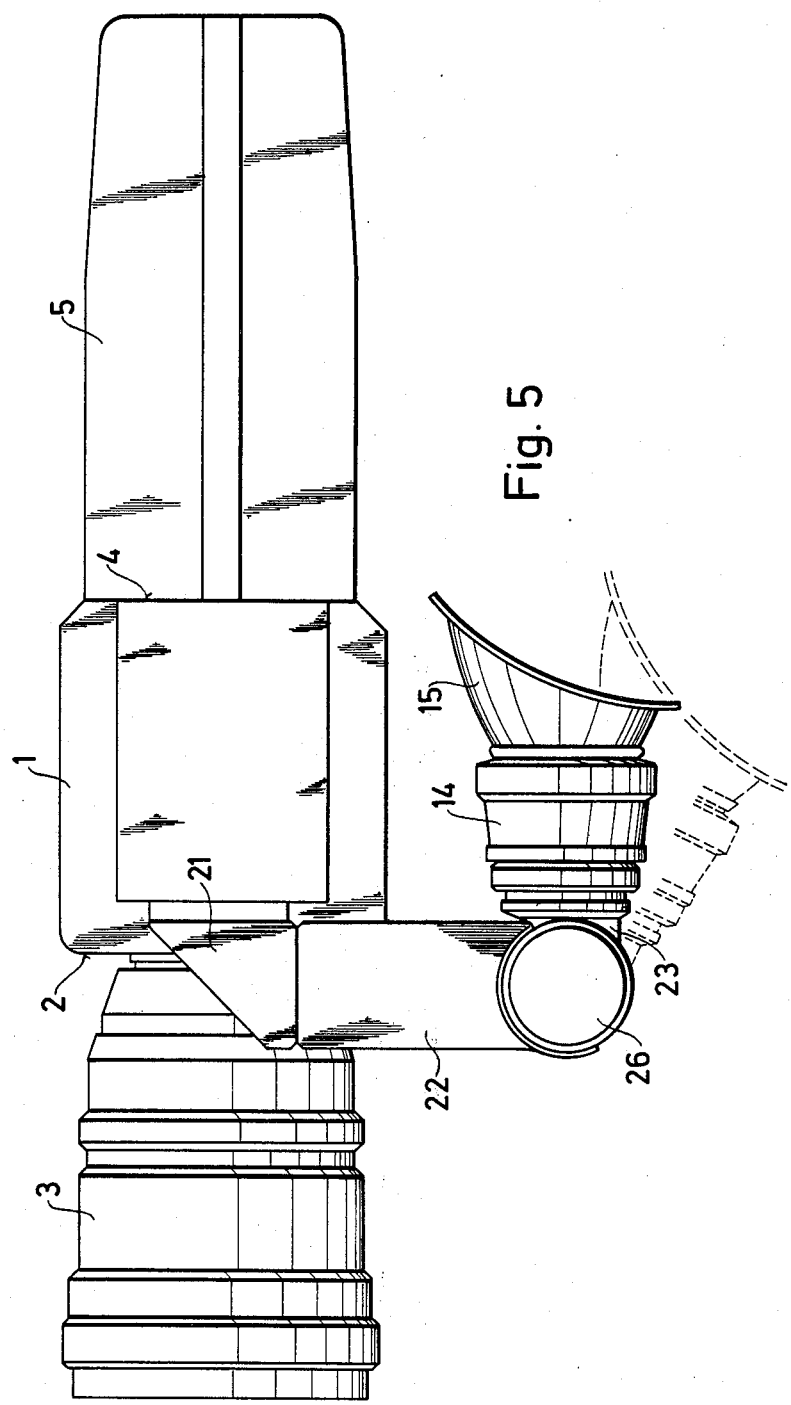

CAMERA WITH ADJUSTABLE VIEWFINDER

This is a continuation-in-part of U.S. patent application Ser. No. 320,251 filed on Jan. 2, 1973, now abandoned.

This invention relates to a motion picture camera adapted to be supported on the shoulder of a user, preferably a reflex camera, and provided with a magnifying viewfinder and a camera handle.

Except for specially made specimens, all known cameras adapted to be supported on the shoulder of the user are designed for users looking into the viewfinder with the right eye. Because persons who have a better vision with the left eye cannot satisfactorily use the motion picture cameras designed for users looking into the viewfinder with the right eye, attachments which permit of a looking into the viewfinder with the left eye are available on the market for many cameras. These known attachments for left-eyed camera operators consist either of a separate, replaceable, longer magnifying viewfinder, which bridges the distance between the eyes so that the left eye can be used to look into the viewfinder, or of an extension attachment, which produces an intermediate image and can be connected to the built-in magnifying viewfinder. In either case, the camera is operated and held in the same manner, whether the user looks into the viewfinder with his right or left eye, and he can look into the viewfinder with his left eye because the eyepiece is disposed at a distance which has been increased by the distance between the two eyes of a human being.

When shooting pictures for news reports, particularly during so-called "hot" shots, such as for reports from a seat of war or on revolutionary events or the like, the camera operator in order to protect his own life often must use that eye which does not look into the viewfinder of the camera in order to watch the actions taking place around the scene being shot. The known cameras basically designed for a look with the right eye into the viewfinder enable only the use of the left eye for such an observation. When looking into the viewfinder with his right eye, the camera operator can watch the environmental actions only with his left eye. When the cameras have been provided with attachments enabling a look into the viewfinder with the left eye, the camera operator is almost prevented from observing the environment because the extended viewfinder more or less obstructs the view with that eye which does not look into the viewfinder.

For this reason it is an object of the invention to provide a motion picture camera which is of the kind defined first hereinbefore and which enables equally well a lock into the viewfinder with the right eye and with the left eye without need for attachments and without adversely affecting the observation of the environment.

In a motion picture camera of the kind defined first hereinbefore, this object is accomplished according to the invention in that the viewfinder light path is diverted from the shooting light path, preferably by the reflex means, and emerges from the camera housing centrally and above the shooting lens, the eyepiece assembly of the magnifying viewfinder is carried by at least one pivoted viewfinder arm so that the eyepiece assembly is pivotally movable to the rear, and said eyepiece assembly is also pivotally movable between positions on the right and left of the camera about the center line of the viewfinder light path exit opening in the camera housing. Such a motion picture camera can be operated and held with the right hand and with the left hand. It is attractive not only to operators having a better vision with the right eye or left eye, but to a much larger range of persons, who can observe through the viewfinder equally well with their right eye and their left eye. Such a person can observe through the viewfinder equally well with his right or left eye so that he may watch the environmental actions on the left or right, as may be required. This advantage will be now illustrated with reference to an example.

If a reporting camera operator carries the camera on his right shoulder and looks with his right eye into the magnifying viewfinder, he can use both hands to hold and operate the camera. At the same time, he can easily watch the environmental actions on the left with his left eye. If the shooting conditions change and it is necessary to watch environmental actions on the right of the scene being shot, the camera operator will place the camera on his left shoulder and will use his left eye to look into the viewfinder, which has been pivotally moved, and he can watch the environmental actions on the right with his right eye.

An essential feature of the camera according to the invention thus resides in the arrangement of the magnifying viewfinder, which extends centrally out of the camera, above the shooting lens, preferably from the front wall of the camera, and which is arranged so that when the camera is placed from one shoulder on the other the viewfinder can be pivotally moved to the right and left about its pivotal axis on the front wall. Because the magnifying viewfinder is pivoted to the camera housing at the center thereof above the shooting lens, the viewfinder when being swung to the right or left moves through a central position, in which the viewfinder extends vertically upwardly so that the camera is now very slender and can be accommodated in a case which is slenderer than the cases required for the known cameras having rigidly mounted magnifying viewfinders.

In a development of the invention, the eyepiece assembly is rotatable through up to 360° about the axis of the viewfinder arm, and compensating means preventing a rotation of the image are provided in the form of a movement-compensating prism. The mechanical compensation of the movement is accomplished in that the prism is driven at an angular velocity which is one-half the angular velocity of the rotational movement. Because the eyepiece assembly is rotatable, the direction of the eyepiece assembly can be selected as desired and shots can be made, e.g., even from a frog's perspective, in that the camera is placed on the ground and the operator watches the scene from above through the vertically extending eyepiece assembly. To prevent a rotation of the image as a result of a change of the direction of the eyepiece assembly, a prism serving as a compensating means is driven as mentioned above in response to a change of the direction of the eyepiece assembly.

In a desirable embodiment of the invention, the viewfinder light path emerges from the camera housing on the front wall thereof and parallel to the optical axis of the shooting lens, and the magnifying viewfinder has a portion which is U-shaped in its basic position and provided with several articulated joints so that the eyepiece assembly can be redirected in such a manner that by means of the articulated joints it can be adjusted to match the anatomic conditions of the operator, e.g., the height of his eyes over the shoulder and/or the position of the eyes relative to the width of the head, and the requirements as to the observation, e.g., for shots from a frog's perspective. To ensure also in this embodiment of the camera that the image is not rotated when the camera is placed from one shoulder to the other and the operator looks into the viewfinder with his left eye rather than the right one, or vice versa, or when intermediate positions are selected, an odd number of reflecting surfaces are provided within that part of the magnifying viewfinder which is rotatable and pivotally movable.

For slender cameras as mentioned above, which can be accommodated in a correspondingly slender case, it will be particularly desirable to adapt such a symmetrical design that all optical components are disposed in one plane when the magnifier is in a vertical, central position.

With a view to the object set forth, the camera according to the invention may be further improved in that the camera handle is arranged to be pivotally movable to positions corresponding to the selected position of the magnifying viewfinder. In a particularly desirable embodiment of the invention, the camera handle is removably secured to the front wall of the camera housing and is provided with a universal joint to be pivotally movable to all directions and enables the use of either hand to operate all controls of the camera, e.g., for initiating the shooting motion of the camera, the measurement of light, etc. When the camera is placed from one shoulder on the other and the operator looks into the viewfinder with his right eye rather than the left one, or vice versa, the camera handle can then also be pivotally moved to the opposite side. Because the camera handle is removably secured to the front wall of the camera housing, shots can be made from a frog's perspective as the camera can readily be placed on the ground. Besides, the design of camera handles according to the invention enables a convenient holding of the camera without fatigue, particularly if the camera handle can be extended in length.

An embodiment of the invention will now be described by way of example with reference to the drawings, in which FIG. 1 shows the magnifying viewfinder in a shooting position, in which it can be looked into with the right eye;

FIG. 4 is a side elevation showing the camera with different positions of the eyepiece assembly being indicated in dotted lines;

FIG. 5 is a top plan view showing the camera with the pivotal movement enabled for the eyepiece being indicated in dotted lines;

Figure 1:
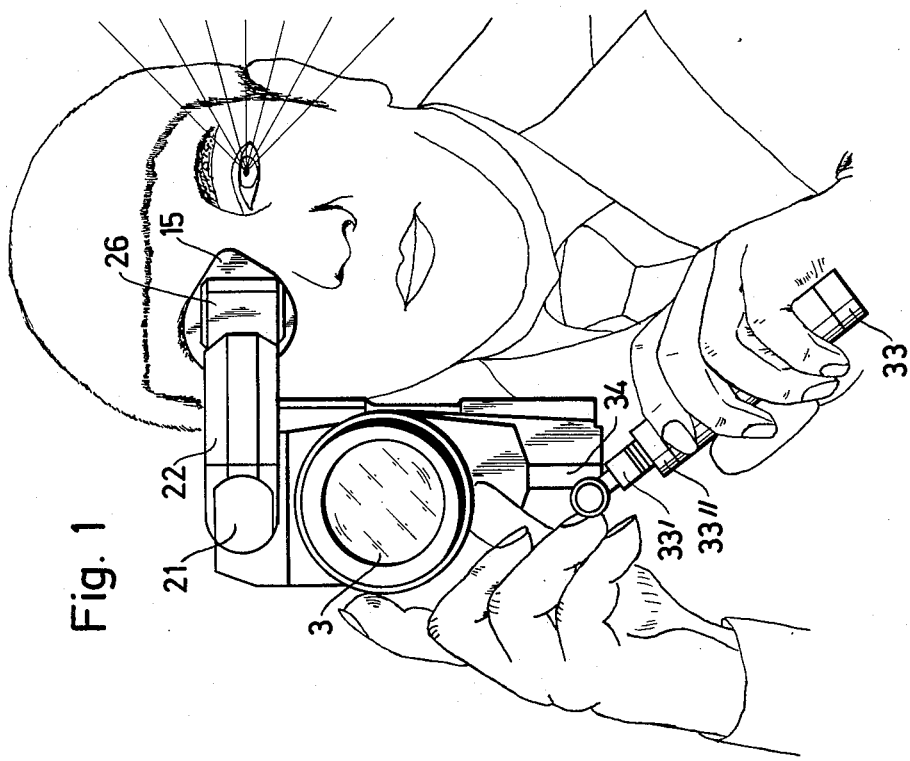

As is best apparent from FIG. 4, a camera housing 1 has a front wall 2, which carries a shooting lens 3, and also has a rear wall 4, which carries a cassette 5. The camera housing 1 also comprises a bottom 6.

Figure 3:
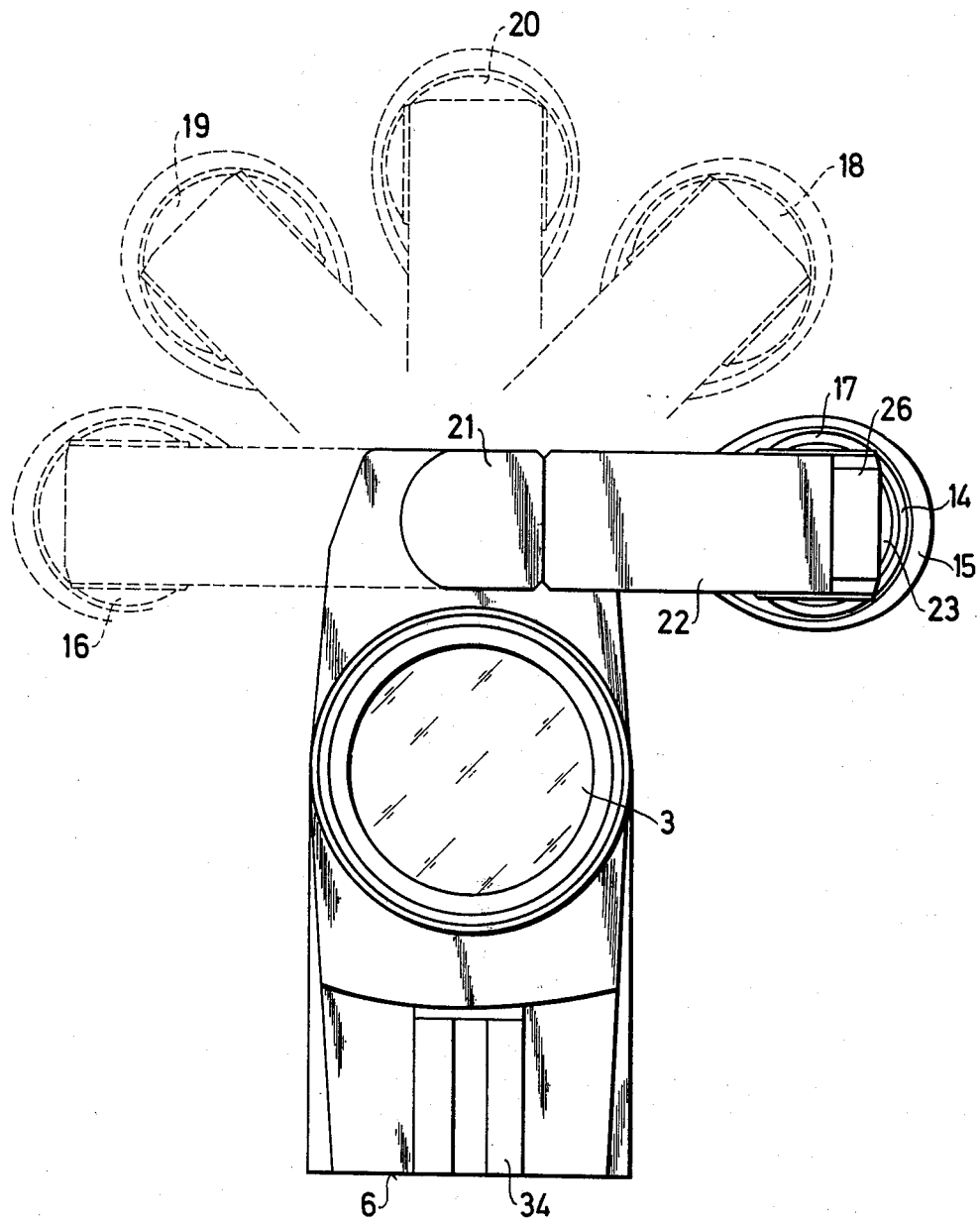
FIG. 3 is a front elevation showing the camera according to the invention with the positions to which the magnifying viewfinder can be moved being indicated in dotted lines.

As is apparent from FIG. 6, a viewfinder light path 9, 10, 11, 12 is diverted by a reflex means 7 from a shooting light path 8 and centrally emerges from the front wall 2 of the camera housing above the shooting lens 3(see FIG. 3) after having been deflected by deflecting means 13 disposed within the camera housing 1. As is best apparent from FIG. 3, an eyepiece 14 provided with an eye cup 15 is pivotally movable through 180° between positions on the right and left sides of the camera about the portion 10 of the viewfinder light path. Said section 10 lies in the center line of the viewfinder light path exit opening in the camera housing 1.

Between its left-hand shooting position 16 indicated in dotted lines and its right-hand shooting position 17 indicated in solid lines, the eyepiece 14 may assume any desired intermediate position. Of these intermediate positions, two positions 18, 19 and a vertical, central position 20 of the eyepiece 14 are indicated in dotted lines. The vertical central position 20 of the eyepiece 14 is also selected when the camera according to the invention is to be stowed in a case. It is readily apparent from FIG. 3 that the camera according to the invention is very slender and for this reason can be accommodated in a slender camera case when the camera is in said position for stowage. This has substantial advantages because the camera can be kept close to the body and can be carried more easily then where the so-called wide camera cases are used, which can be carried only with an arm which is crooked.

The viewfinder portion which connects the eyepiece 14 to the camera housing 1 is U-shaped in its basic position, as is best apparent from FIG. 5, and comprises a deflecting section 21, a viewfinder arm 22 and an eyepiece carrier 23. By means of the deflecting section 21, the eyepiece 14 is pivotally movable about the portion 10 of the viewfinder light path, which lies in the center line of the viewfinder light path exit opening in the front wall 2 of the camera housing 1. Outside the camera housing 1, the deflecting section 21 comprises a first viewfinder light path-deflecting means 24, which forms part of the pivoted viewfinder means and deflects the viewfinder light path through 90°. The viewfinder arm 22 is pivotally movable and is rotatable on its axis (FIG. 6), which coincides with the corresponding portion 11 of the viewfinder light path. The eyepiece carrier 23 is a pivoted arm, which contains the eyepiece 14 and carries the eye cup 15. The viewfinder arm 22 accommodates the next following viewfinder light path-deflecting means 25, which constitute mechanically rotatable compensating means that prevent a rotation of the image and consist of a direct-vision prism, which is driven at an angular velocity that is one-half of the angular velocity of the rotational movement.

An articulated joint 26 connects the viewfinder arm 22 to the eyepiece carrier 23 and accommodates a final viewfinder light path-deflecting means in the form of a movement-compensated mirror 27, which deflects the viewfinder light path toward the eyepiece assembly. It is apparent that the viewfinder light path 9–12 is diverted by the reflex means 7 and emerges forwardly from the front wall 2 of the camera centrally over the shooting lens 3 and parallel to the optical axis 8 of said lens, and by means of the three-part magnifying viewfinder portion 21, 22, 23 is rearwardly deflected to the eyepiece assembly 14, 15. That portion of the magnifying viewfinder which is disposed outside the camera can assume a basic position, in which said portion is U-shaped, and can perform several pivotal and rotational movements. Because the deflecting section 21 is pivoted in the camera housing, the eyepiece 14 together with the eye cup 15 can be pivotally moved between positions on the right and left of the camera. As the viewfinder arm 22 of the magnifying viewfinder is rotatable, the eyepiece assembly can be adjusted to extend in the directions shown in FIG. 4. For an adaptation of the eye cup 15 to the position of the eyes relative to the width of the head, the eyepiece carrier 23, which carries the eyepiece 14 and the eye cup 15, is pivoted to the rotatable and pivotally movable viewfinder arm 22 of the magnifying viewfinder, as is indicated in dotted lines in FIG. 5.

The diagrammatic showing of the optical system in FIG. 6 represents also a film 28, a film gate 29 and the optical image-forming system 30 of the magnifying viewfinder from the ground-glass screen 31 to the aerial image plane 32.

Figure 2:
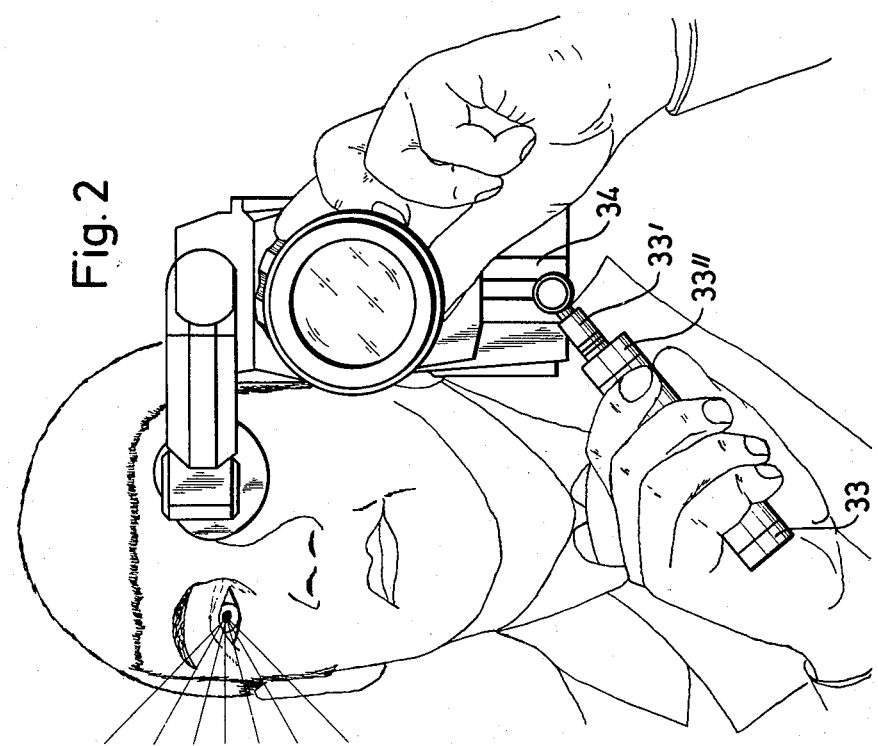
FIG. 2 shows the magnifying viewfinder in a position in which it can be looked into with the left eye.

A camera handle 33 is apparent from FIGS. 1 and 2 and is pivotally movable to positions which correspond to the position of the magnifying viewfinder. This is apparent upon a comparison of FIGS. 1 and 2. The camera handle is removably secured to the front wall 2 of the camera housing 1 by a fixing shoe 34 and by means of a universal joint is movable to all sides. The fixing show 34 serves also for mounting the compendium. As is apparent from FIGS. 1 and 2, the camera handle 33 consists of two parts 33' and 33'', which are telescopically extensible so that the camera handle 33 can be extended in length. The design of the camera handle and the locations of all controls of the camera are selected so that the camera handle can be operated by either hand, as is also apparent from FIGS. 1 and 2.

Also, it is apparent from FIGS. 4 and 5 that the cassette 5, in which the film reels are coaxially disposed, conforms in width and height to the slender design of the camera housing 1.

Figure 6A:
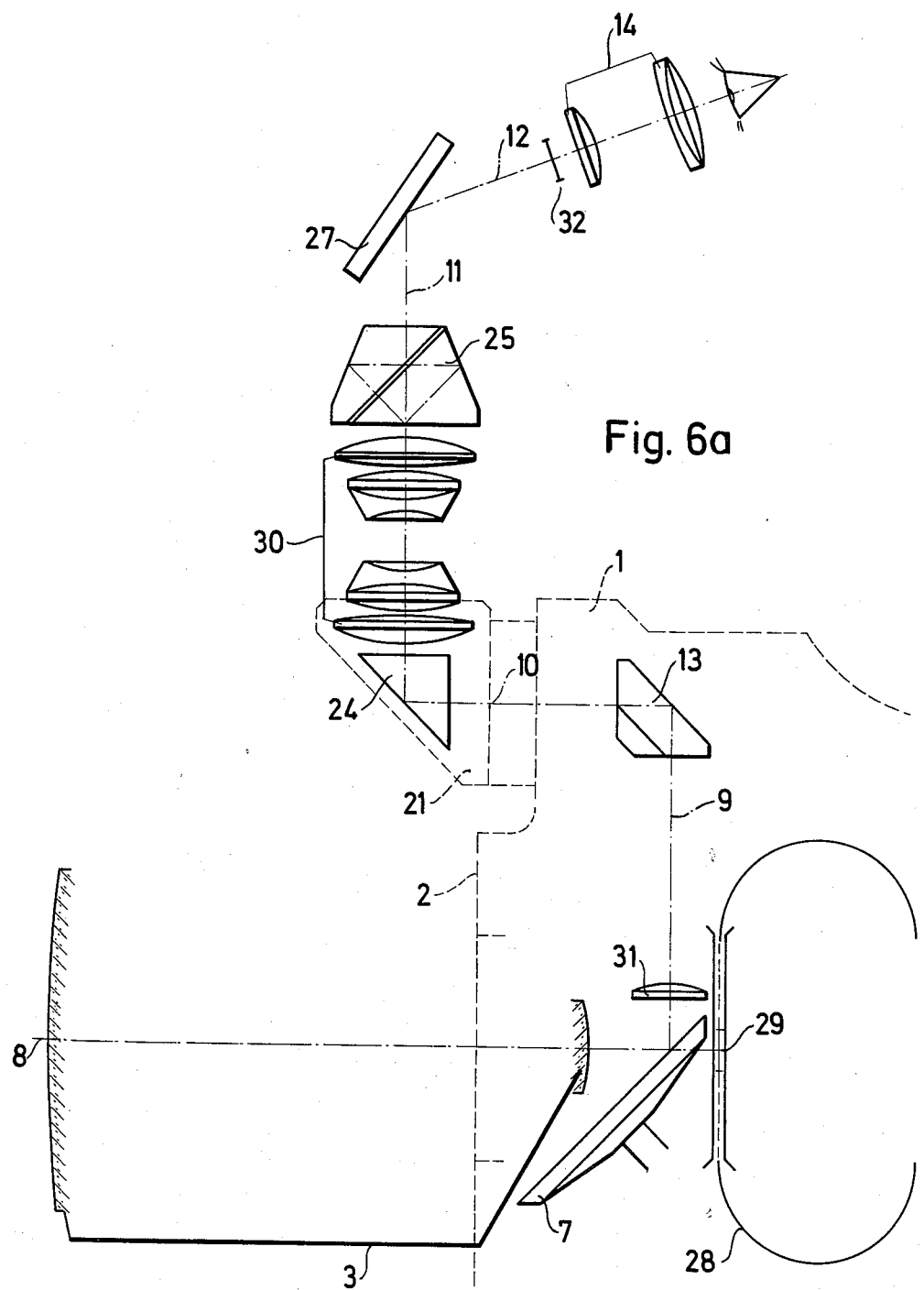
FIG. 6(a) shows a diagram representing the optical system of the camera according to the invention.

With specific reference, now, to FIGS. 6(a) through 6(c), the mechanical and optical system of the pivotable eyepiece mechanism will be explained. Initially, it should be noted that the path-deflecting prism is of the Pechan design. That is, two prism elements are separated by an air gap. The Pechan prism is discussed by Dr. Helmut Naumann at pages 80 and 81 of Optics for Design, 3d Ed. (1970), Knapp Verlag, Dusseldorf.

When the eyepiece is swung to the left or right around the viewfinder light path exit 10 on the front of the camera, the Pechan prism 25 serves the purpose of ensuring an odd number of reflections between the viewfinder light path exit 10 and the virtual image plane 32. This odd number of reflections maintains the same up-down and left-right orientation of the virtual image 32 in the left and right positions of the viewfinder eyepiece. When the eyepiece 14 is rotated about the optical axis 11 by means of the eyepiece support 23 and the viewfinder arm 22, adjustment of the image is effected by prism 25 which is adapted to rotate half the amount in the same direction as the eyepiece. As can be seen in FIG. 6(b), the prism 25 and the optical imaging system are mounted in a mechanical mounting tube 41. Tube 41 has at least one, but preferably several beveled geared wheels 42 rotatably mounted on its outer diameter. As described above, the viewfinder arm 22 is rotatably mounted on the deflecting section 21 which houses the deflecting device 24.

The deflecting section 21 has beveled geared teeth 43 on its forward end. The swingable viewfinder arm 22 is rigidly screwed to a beveled ring gear 44 on the inner diameter of the viewfinder arm.

When the eyepiece 14 is rotated by the eyepiece mount 23 and the viewfinder arm 22, the beveled gear wheels 42 of the mounting tube 41 roll between the beveled gear teeth 43 on the deflection section 21 and the ring gear 44 screwed to the eyepiece arm 22. Therefore, the mounting tube 41, with the associated prism 25, rotates by what can be termed a differential drive, through one-half the angle and in the same direction as the viewfinder arm.

Figure 6B:
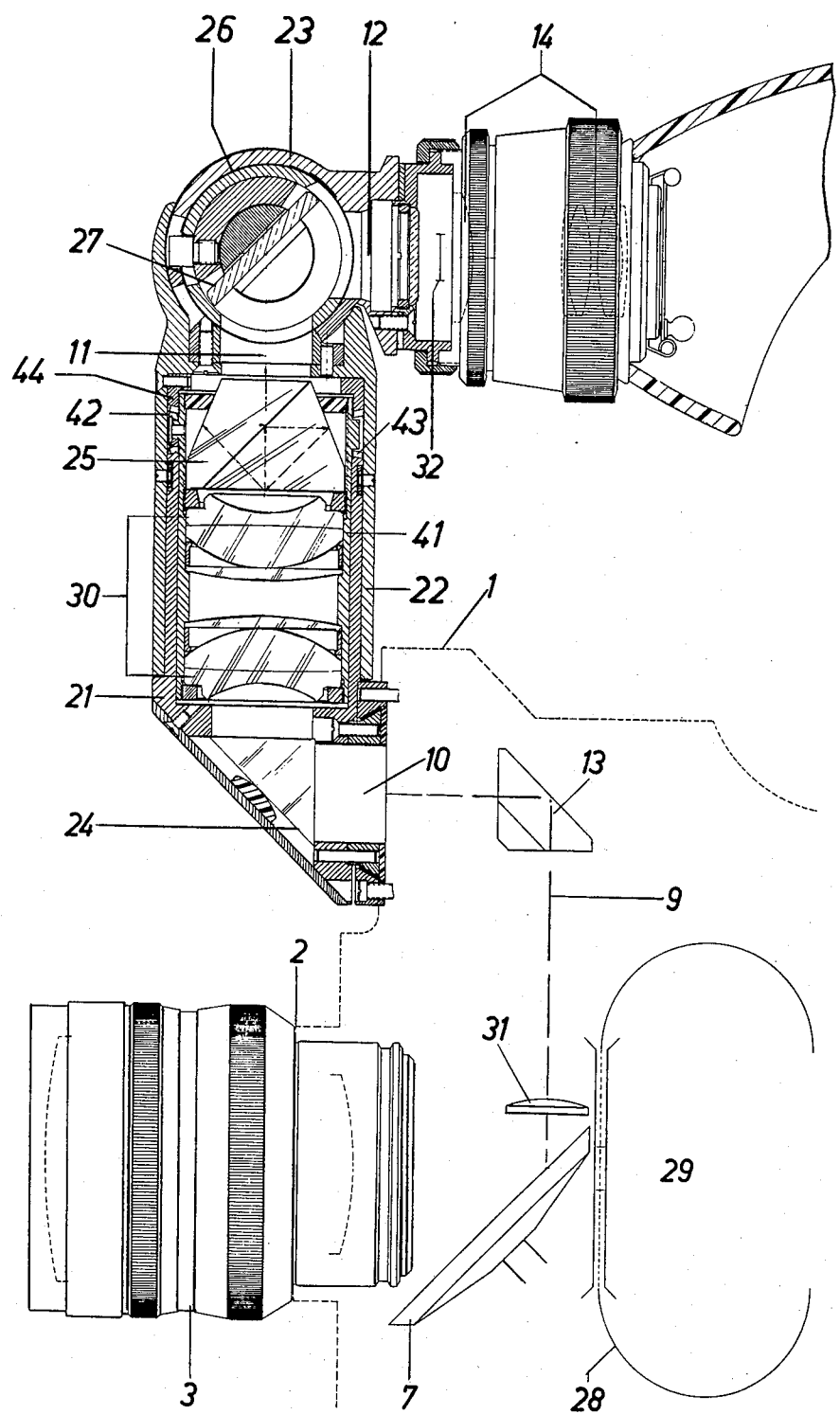
FIG. 6(b) is a diagram, partly in section, illustrating the mechanical system which prevents image rotation during camera adjustment.

While the embodiment illustrated in FIG. 6(b) contemplates that the prism 25 and the optical imaging system 30 are in a common mounting tube 41 adapted for simultaneous rotation, such is not necessary. The virtual image 32 will remain fixed even if the rotationally symmetrical optical imaging system 30 is fixed. Accordingly, only the prism 25 need be rotated when the viewfinder arm is rotated.

The eyepiece 14, as noted above, is also adapted to rotate through 360°. While a mechanical stop could be provided (since the eyepiece is used only through the half circle facing the rear of the camera), none is provided because of the susceptibility to damage in view of the large lever arm of the eyepiece. The horizontal swing of the eyepiece occurs about joint 26. The deflection mirror 27 mounted within the joint 26 is also motion compensated to prevent image rotation when the eyepiece is rotated. Motion compensation can here be accomplished by a simple camming arrangement.

Figure 6D:
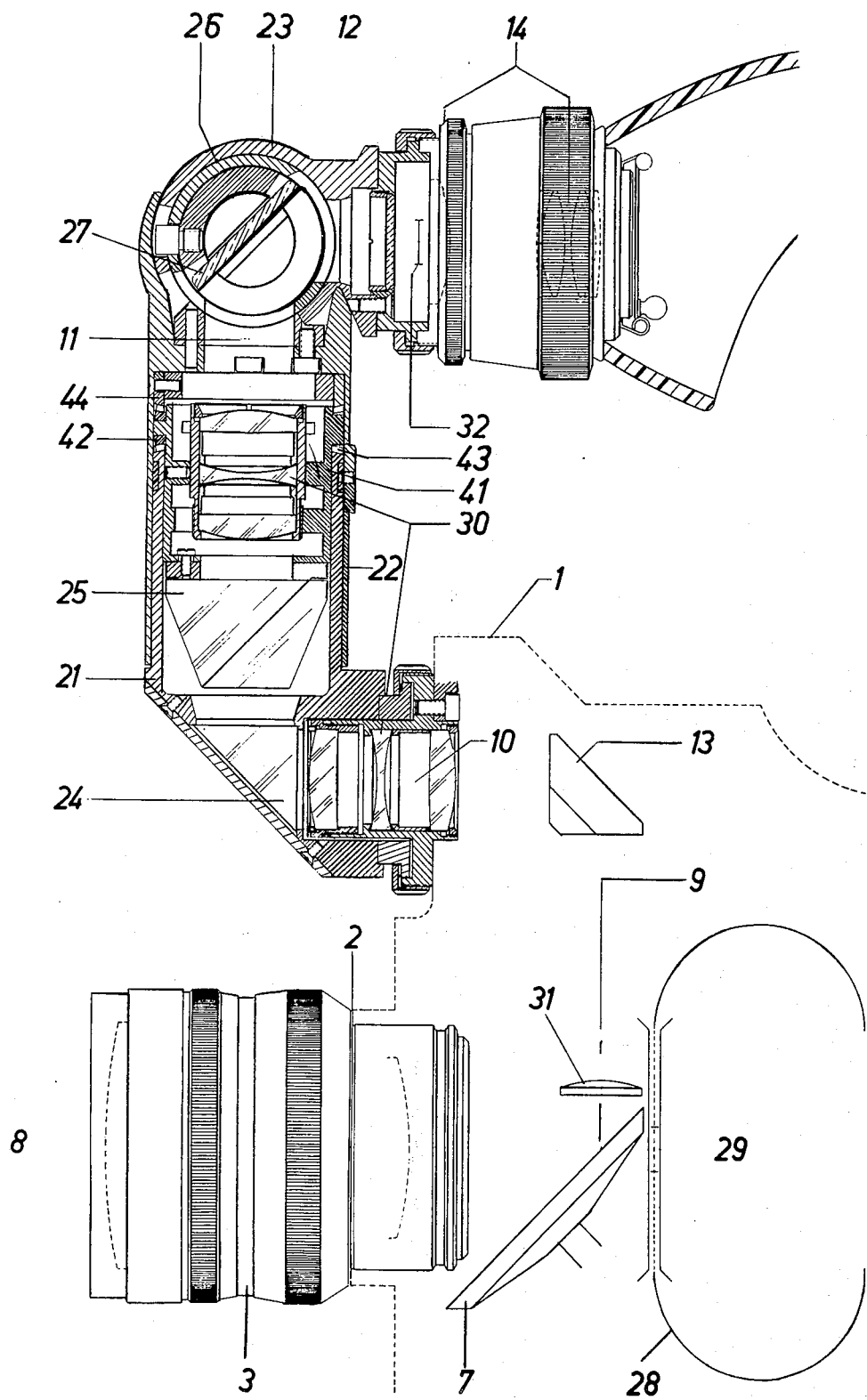
FIG. 6(d) is a view similar to FIG. 6(b), but illustrating another embodiment of the invention.
Figure 6C:
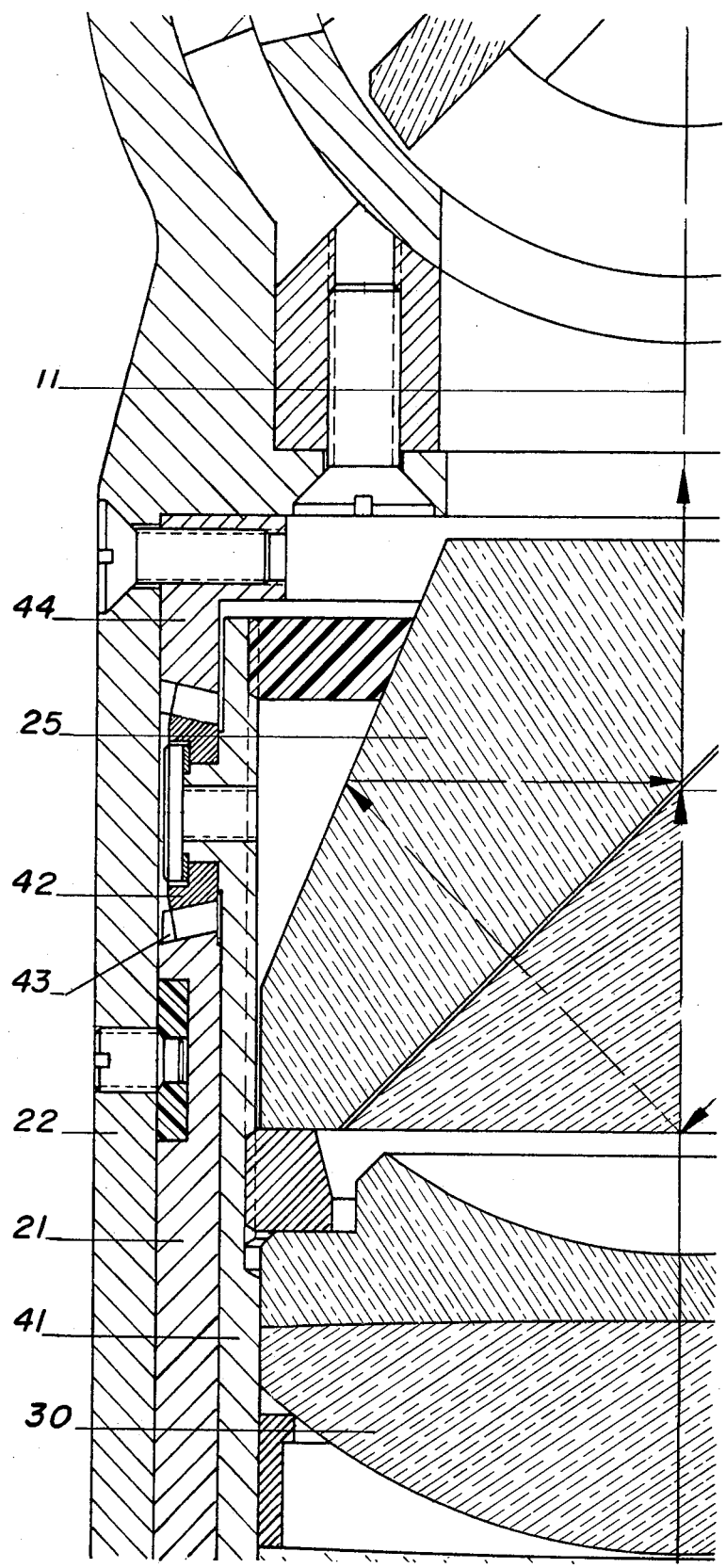
FIG. 6(c) is an enlarged section showing a portion of the system illustrated in FIG. 6(b)

With reference now to FIG. 6(d), another embodiment of the present invention will be described. In this embodiment, the imaging system comprises two separately mounted half-objectives forming a tandem system. The light path deflecting device 24 and the Pechan prism 25 are located between the two half-objectives of the tandem imaging system 30. Prism 24 is mounted on the deflecting section 21 in a common mounting tube 41, with the Pechan prism 26 again being rotatably mounted with the half of the imaging system 30 directed toward the eyepiece. The image position adjustment of this embodiment is like that described with reference to FIGS. 6(a) through 6(c), by means of one or more beveled gear wheels 42 and ring gears 43 and 44.

Figure 7:
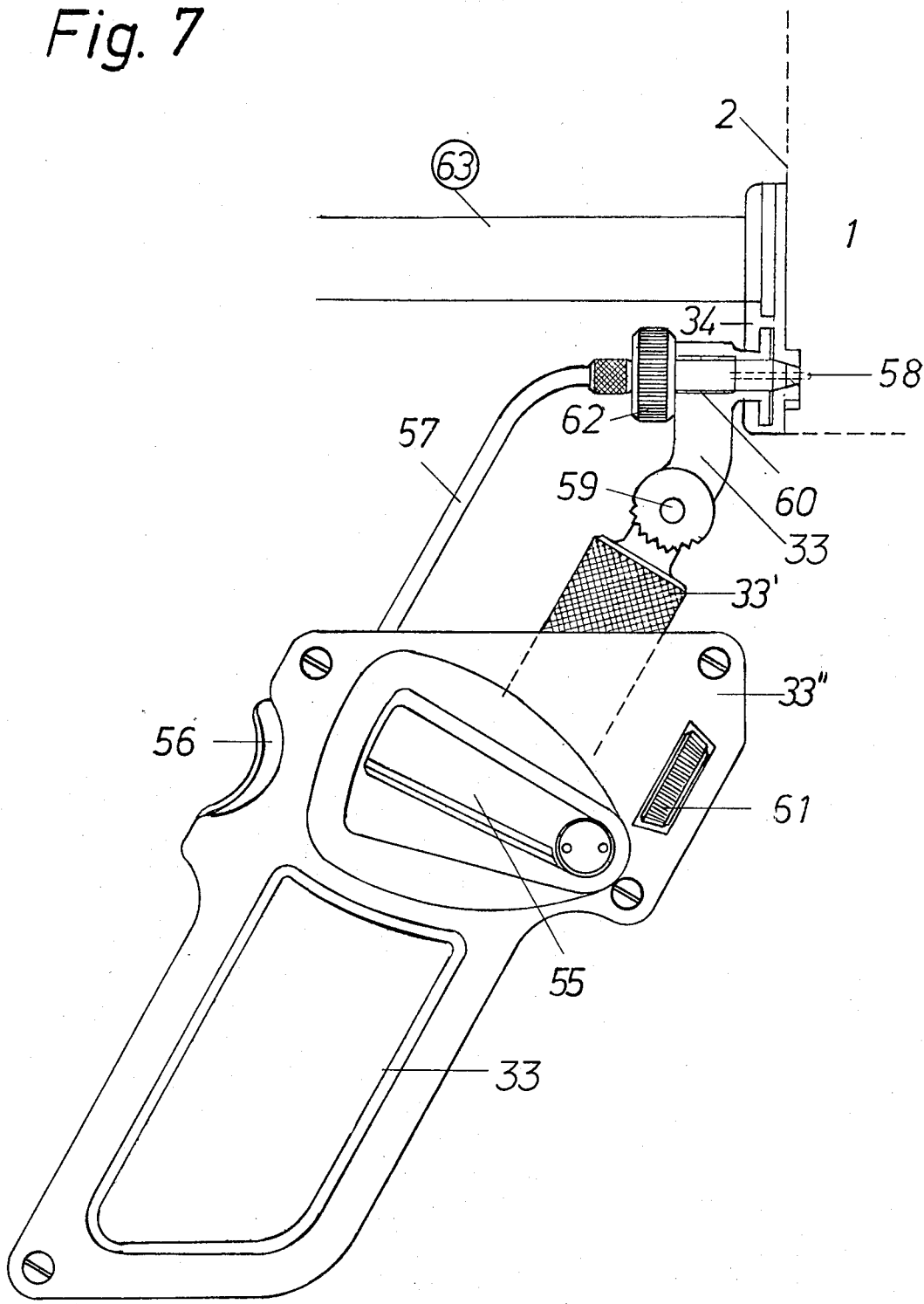
FIG. 7 is an enlarged view of the hand grip shown in FIG. 1.

Turning now to FIG. 7, the hand grip mechanism will be described. As noted previously, the viewfinder eyepiece and the hand grip can be individually adjusted, and in this manner, maximum versatility can be achieved.

As illustrated in FIGS. 1 and 2, 55 defines the trigger for the light meter, with one trigger being mounted on each side of the hand grip. Lever 56 defines a shooting trigger to control the operation of the camera. Both levers 55 and 56 associate with the camera through Bowden control cables 57 and attaching shoe 34 on the front side of the camera. As is well known, a release pin 58 extends into the interior of the camera housing to effect different camera functions.

The handle 33 can be mounted both in the vertical and left and right positions. Element 59 is the joint for the vertical positioning of the hand grip, while element 60 effects the left and right swinging action. A thumb screw 61 claims the telescopic extension between the hand grip portions 33' and 33''. The hand grip is also provided with a thumb screw 62 to mount the hand grip to the attaching shoe on the camera housing. Finally, numeral 63 represents a tripod adapted to be used in conjunction with the present invention.

While the foregoing description has been directed to specific embodiments of the present invention, it should be appreciated that the description has been given for illustrative purposes only, without any intention to limit the scope of the present invention in any manner whatsoever. Rather, the scope of the invention is set forth in the claims appended hereto.

What is claimed is:

1. A photographic camera comprising: a camera housing; a lens mounted on said housing for receiving light from the subject being photographed and for directing such light to an associated photographic film, the light path from the subject to the film defining a shooting light path; a viewfinder comprising a light entry opening, a light exit opening and an intermediate light transmitting arm for receiving light from the subject being photographed and for directing such light to the eye of the photographer, the light path from the subject to the eye of the photographer defining a viewfinder light path; optical means for diverting the viewfinder light path from the shooting light path and for directing the viewfinder light out of the camera housing; a magnifying eyepiece pivotally mounted on the arm of said viewfinder for defining said light exit opening in a direction facing away from the subject being photographed; and mounting means for rotatably mounting said arm and its associated eyepiece about an axis substantially parallel to a line between the lens and the subject being photographed for enabling said viewfinder to be pivoted between positions on the right and left sides of the camera housing.

2. A camera according to claim 1, and further comprising: means for mounting said magnifying eyepiece for rotation about said viewfinder arm.

3. A camera according to claim 1, wherein said camera is a reflex camera and further comprising means for diverting a portion of the light from the image toward said viewfinder.

4. A camera according to claim 1, wherein said magnifying eyepiece is rotatable through up to 360° about the axis of the viewfinder arm.

5. A camera according to claim 1, and further comprising means associated with said viewfinder for compensating for the rotation of the image of the subject when the magnifying eyepiece is rotated.

6. A camera according to claim 5, wherein said compensating means takes the form of a movement-compensating prism and means for rotating said compensating prism in the same direction but through half the distance of rotation of the magnifying eyepiece.

7. A camera according to claim 1, wherein the viewfinder image emerges from said camera housing through the front wall thereof in parallel to the shooting light path of the lens; wherein the viewfinder has a U-shaped portion to reflect the image from the front of the camera toward the rear thereof; and further comprising a plurality of articulated joints on said viewfinder for adjusting the magnifying eyepiece to the camera user.

8. A camera according to claim 6, wherein an odd number of reflecting surfaces is provided in that part of the viewfinder which is rotatably and pivotably movable.

* * * * *